(12) United States Patent
Hagen (10) Patent No.: US 9,174,529 B2
(45) Date of Patent: *Nov. 3, 2015

(54) DEVICE FOR VENTILATING AND AERATING A FUEL TANK

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 909 days.

This patent is subject to a terminal disclaimer.

(21) Appl. No.: 13/328,262

(22) Filed: Dec. 16, 2011

(65) Prior Publication Data

US 2012/0186670 A1 Jul. 26, 2012

(30) Foreign Application Priority Data

Dec. 21, 2010 (DE) .......................... 10 2010 055 316

(51) Int. Cl.
*B60K 15/035* (2006.01)
*B60K 15/03* (2006.01)

(52) U.S. Cl.
CPC . *B60K 15/03519* (2013.01); *B60K 2015/03276* (2013.01); *B60K 2015/03302* (2013.01); *B60K 2015/03514* (2013.01); *B60K 2015/03566* (2013.01); *Y10T 137/7838* (2015.04)

(58) Field of Classification Search
CPC ............... B60D 15/03519; B60K 2015/03276; B60K 2015/03514; B60K 2015/03566
USPC ............ 137/493, 493.8, 493.9; 123/516, 518, 123/519
See application file for complete search history.

(56) References Cited

U.S. PATENT DOCUMENTS

| | | | | |
|---|---|---|---|---|
| 3,769,952 A | * | 11/1973 | Fiedler et al. ................. | 123/518 |
| 4,343,281 A | * | 8/1982 | Uozumi et al. ............... | 123/519 |
| 5,181,497 A | * | 1/1993 | Matsushita et al. ........... | 123/520 |
| 5,197,442 A | * | 3/1993 | Blumenstock et al. ....... | 123/520 |
| 5,211,151 A | * | 5/1993 | Nakajima et al. ............. | 123/520 |
| 5,429,097 A | | 7/1995 | Wojts-Saary et al. | |
| 5,477,829 A | * | 12/1995 | Hassinger et al. ......... | 137/493.8 |
| 5,497,754 A | * | 3/1996 | Ito ................................. | 123/520 |
| 5,564,466 A | * | 10/1996 | Aoyama et al. ............ | 137/493.8 |
| 5,853,162 A | * | 12/1998 | Zurke ......................... | 137/493.8 |
| 6,062,250 A | * | 5/2000 | Takahashi ................... | 137/493.8 |
| 6,796,295 B2 | * | 9/2004 | Kidokoro et al. ............. | 123/520 |
| 6,948,523 B2 | | 9/2005 | Viebahn | |

(Continued)

FOREIGN PATENT DOCUMENTS

CN 1272083 A 11/2000
CN 201080130 Y 7/2008

(Continued)

OTHER PUBLICATIONS

Chinese Search Report with respect to counterpart Chinese patent application 201110432489.6.
Translation of Chinese Search Report with respect to counterpart Chinese patent application 201110432489.6.

*Primary Examiner* — Craig Schneider
*Assistant Examiner* — Nicole Wentlandt
(74) *Attorney, Agent, or Firm* — Henry M. Feiereisen LLC (57) ABSTRACT

A device for ventilating and aerating a fuel tank includes a tank shut-off valve and two tank pressure control valves. One of the tank pressure control valves opens in response to a negative pressure in the fuel tank and the other one of the tank pressure control valves opens in response to an overpressure in the fuel tank. The opening pressures of the two tank pressure control valves are adjustable flexibly and independent of the respective other valve.

18 Claims, 10 Drawing Sheets

(56) References Cited

U.S. PATENT DOCUMENTS

| | | | |
|---|---|---|---|
| 7,290,564 B2 | 11/2007 | Takahashi et al. | |
| 8,967,193 B2 * | 3/2015 | Hagen | 137/493.8 |
| 2001/0010219 A1 * | 8/2001 | Isobe et al. | 123/520 |
| 2002/0088957 A1 | 7/2002 | Weldon et al. | |
| 2002/0185181 A1 | 12/2002 | Weldon et al. | |
| 2003/0089345 A1 | 5/2003 | Itou et al. | |
| 2006/0011257 A1 | 1/2006 | Devall | |
| 2008/0295893 A1 * | 12/2008 | Bittner et al. | 137/116.3 |
| 2010/0269921 A1 | 10/2010 | Pifer et al. | |
| 2012/0111307 A1 | 5/2012 | Hagen | |

FOREIGN PATENT DOCUMENTS

| | | |
|---|---|---|
| CN | 101279584 A | 10/2008 |
| DE | 30 32 243 | 4/1982 |
| DE | 40 40 895 | 6/1992 |
| DE | 42 41 274 C1 | 1/1994 |
| DE | 101 20 542 A1 | 11/2002 |
| DE | 102007002899 | 7/2008 |
| DE | 11 2004 000 114 B4 | 1/2009 |
| DE | 10 2010 019 831 A1 | 11/2011 |
| JP | 2001099015 | 4/2001 |

* cited by examiner

DEVICE FOR VENTILATING AND AERATING A FUEL TANK

CROSS-REFERENCES TO RELATED APPLICATIONS

This application claims the priority of German Patent Application, Serial No. 10 2010 055 316.6, filed Dec. 21, 2010, pursuant to 35 U. S. C. 119(a)-(d).

BACKGROUND OF THE INVENTION

The invention relates to a device for ventilating and aerating a fuel tank.

Devices of the aforementioned type are provided between the fuel tank and an activated carbon filter to prevent an undesired leaking of volatile hydrocarbons from the fuel tank into the environment of the motor vehicle. The tank shut-off valve is a controllable valve, for example an electromagnetic valve, which is normally closed and is opened during refueling of the fuel tank to conduct a gas mixture which was displaced from the fuel tank, through the activated carbon filter and to adsorb the hydrocarbons (HC) contained in the gas mixture so that only purified air is released into the environment. The two tank pressure control valves are an overpressure valve and a negative pressure valve, which are also normally closed. The overpressure valve opens automatically when for example in the case of rising ambient temperatures or during a residual heating phase after turning off the internal combustion engine a predetermined overpressure forms in the interior of the fuel tank as a result of evaporation of fuel, while the negative pressure valve opens automatically when in the case of falling ambient temperatures fuel condenses in the interior of the fuel tank and as a result a predetermined negative pressure forms in the interior of the fuel tank.

Known devices of this type are usually configured as combination valve in which the tank shut-off valve and the two tank pressure control valves which are configured as bypass valves, are combined, wherein the tank pressure control valves in praxis usually have a single membrane, which in the case of overpressure or negative pressure is deflected against the force of a spring to open the valve. The opening pressure of the valve is determined by the surface area of the membrane and the spring characteristic of the spring which acts on the membrane and can therefore be influenced only by changing the spring characteristic when a single membrane is used. For example, a harder spring can be used when the opening pressure of the valve in the case of overpressure in the tank, i.e. the positive pressure difference between the interior of the tank and the interior of the activated carbon filter, at which the valve opens, is to be set to a greater value. This has the consequence however, that the valve in the case of a negative pressure in the fuel tank also only opens in the case of a greater pressure differential between the interior of the fuel tank and the interior of the activated carbon filter, i.e. when a greater negative pressure is present in the interior of the fuel tank. This does not allow for adjusting the opening pressures for the both cases of an overpressure or a negative pressure in the fuel tank, respectively in a sufficiently flexible manner.

SUMMARY OF THE INVENTION

Taking the foregoing into account, the invention is based on the object to improve a device of the aforementioned type so that the opening pressures of the two tank pressure control valves can be adjusted in a flexible manner and independent of the respective other valve.

This object is solved according to the invention, in that the two tank pressure control valves are independent of one another, so that the opening pressures of the two tank pressure control valves can be adjusted in a flexible manner and independent of one another for example by changing the spring characteristic and/or the size of the membrane of each tank pressure control valve.

In a preferred embodiment of the invention the two tank pressure control valves and the tank shut-off valve are constructed modular, so that they can be combined to valve units or valve assemblies if needed. Preferably, the two tank pressure control valves are either combined with the tank shut-off valve to form a valve unit or valve assembly according to a first embodiment of the invention, or according to a second embodiment of the invention they are combined with one another to form a valve unit or valve assembly.

The first mentioned embodiment of the invention has the advantage that the valve unit made of the two tank pressure control valves and the tank shut-off valve, only requires a single tank connection which can be connected to the fuel tank, and only a single filter connection which can be connected to the activated carbon filter. These connections are advantageously arranged on the tank shut-off valve, wherein they respectively communicate via interior spaces of the tank shut-off valve with one of two chambers in the interior of each of the tank pressure control valves so that the pressure inside the fuel tank or the activated carbon filter respectively, is also present in the interior of each of the respective chambers of the negative pressure valve.

To minimize the installation space of the valve unit made of the two tank pressure control valves, a preferred embodiment of the invention provides for the tank shut-off valve to include two parts which are rotatable relative to one another and preferably are fixable in any desired rotational orientation relative to one another, whose rotation axis preferably coincides with the longitudinal middle axis of the tank shut-off valve, wherein one of the two parts is provided with fastening means for fastening of the tank shut-off valve and the other one of the two parts is provided with the two tank pressure control valves and the two connections, i.e. the tank connection and the filter connection. In this way the part with the two tank pressure control valves and the two connections can be rotated into a favorable position depending of the space conditions, regardless of the orientation of the mounting which serves for mounting the valve unit. The two tank pressure control valves are preferably arranged on opposite sides of the tank shut-off valve, which is advantageous with regard to installation space and also facilitates the connection of the two chambers of each valve to separate interior spaces of the tank shut-off valve.

The latter embodiment of the invention has the advantage that the two tank pressure control valves can be mounted separate from the tank shut-off valve, for example the two tank pressure control valves inside the fuel tank and the tank shut-off valve outside the fuel tank.

The principle construction of the tank pressure control valves is the same in both embodiments according to the invention: Each tank pressure control valve includes two chambers which are separated by a membrane, one of which is communicates with the tank connection and one with the filter connection. The membrane has an opening around which it is pressed against the free end of a pipe socket, which traverses one of the chambers and trough an opening leads into the other chamber in which the spring is located. The connection between the two chambers and the tank connection or the filter connection respectively is inverted in the overpressure valve and in the negative pressure valve. In the overpressure valve the chamber which surrounds the pipe socket communicates with the fuel tank and the chamber which is equipped with the spring communicates with the activated carbon filter. When an overpressure forms in the fuel tank which exceeds the opening pressure of the overpressure valve, the membrane is lifted by the overpressure from the pipe socket against the force of the spring, so that the two chambers communicate with one another. In the negative pressure valve the chamber which is equipped with the spring communicates with the fuel tank and the chamber surrounding the pipe socket communicates with the activated carbon filter. When a negative pressure forms in the fuel tank, which exceeds the opening pressure of the negative pressure valve, the membrane is pushed by the negative pressure from the pipe socket against the force of the spring, so that the two chambers also communicate with one another.

The tank shut-off valve has two connections, namely one connection which is connectable to the fuel tank and one which is connectable to the activated carbon filter, and is advantageously constructed so that the two connections open downwards, when the tank shut-off valve is mounted vertically, i.e. with vertical longitudinal middle axis, while they open towards a side and are arranged below a longitudinal middle plane of the tank shut-off valve, when the tank shut-off valve is mounted horizontally, with horizontal longitudinal middle axis. The connections expediently protrude over the valve unit, so that a hose or tube can be fastened to each connections.

When the tank shut-off valve according to the preferred embodiment of the invention described above, includes two parts which are rotatable relative to one another and preferably are fixable in any desired rotational orientation, one of which parts is provided with fastening means for fastening the tank shut-off valve and the other is provided with the filter connection and the two tank pressure control valves and the tank connection, the part with the two tank pressure control valves and the two connections can always be rotated regardless of the orientation of the mounting in such a manner as to allow a good condensate drainage, wherein in a horizontal mounting of the tank shut-off valve both connections advantageously are arranged below its longitudinal middle plane and preferably as low as possible.

The two connections each lead into an internal space of the tank shut-off valve, wherein the site of entry of each connection into the corresponding internal space is expediently arranged at the lowest point of the respective internal space in vertical as well as horizontal mounting position, and is preferably at least partially delimited by slanted surfaces which are inclined downwards toward the junction. This facilitates the drainage of condensate which may have formed, out of the tank shut-off valve and also out of the two tank pressure control valves, if these are combined into a valve unit.

BRIEF DESCRIPTION OF THE DRAWING

In the following, the invention is explained in more detail by way of exemplary embodiments shown in the drawing. It is shown in.

DETAILED DESCRIPTION OF PREFERRED EMBODIMENTS

The valve unit 1 shown in the FIGS. 1 to 4 serves for ventilating and aerating a fuel tank (not shown) and is intended to be mounted between the fuel tank and an activated carbon filter (not shown), which prevents the escape of volatile hydrocarbons into the atmosphere or the environment when ventilating and aerating the fuel tank.

Figure 1:
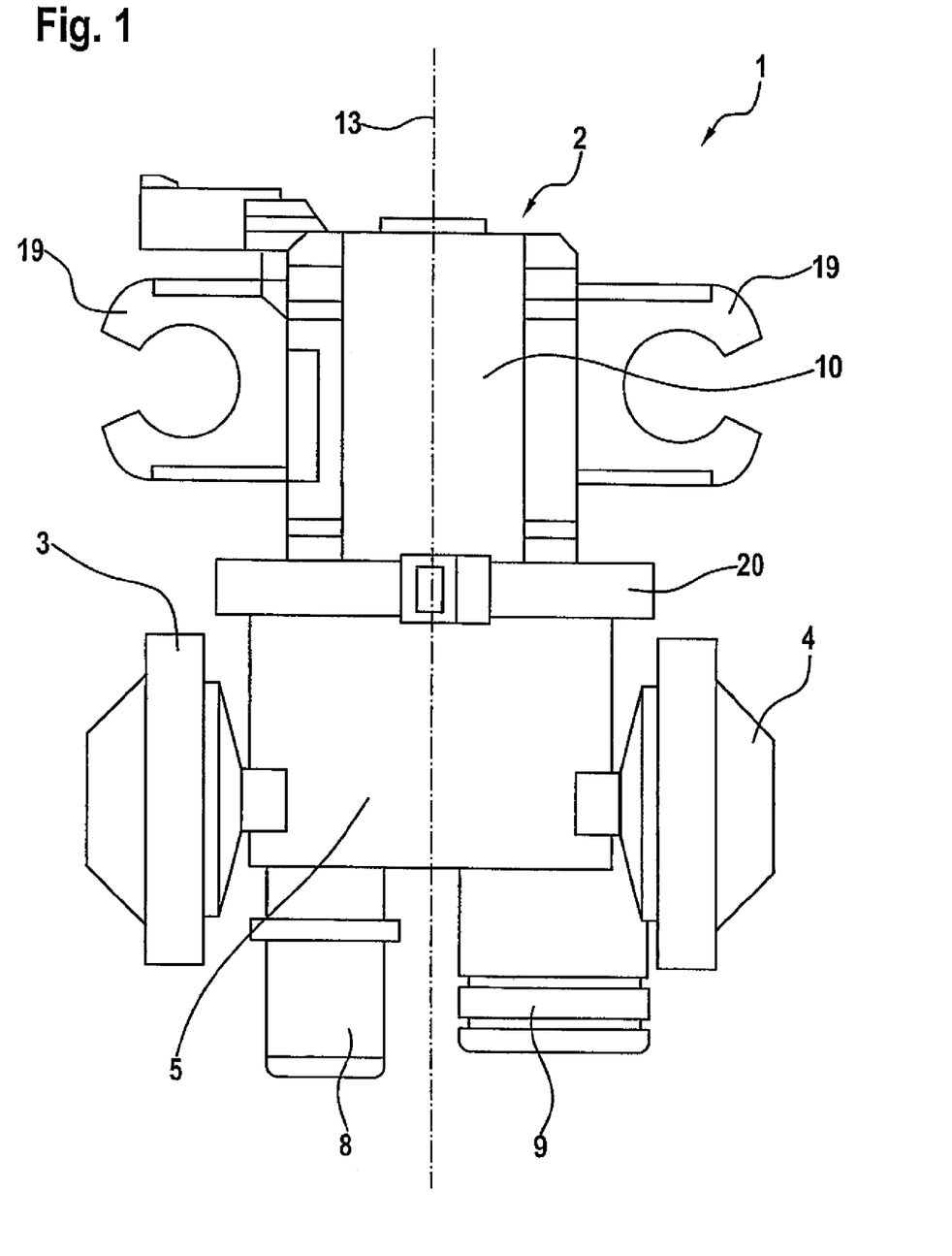
FIG. 1 a schematic side view of a valve unit with a tank shut-off valve and two tank pressure control valves.
Figure 2:
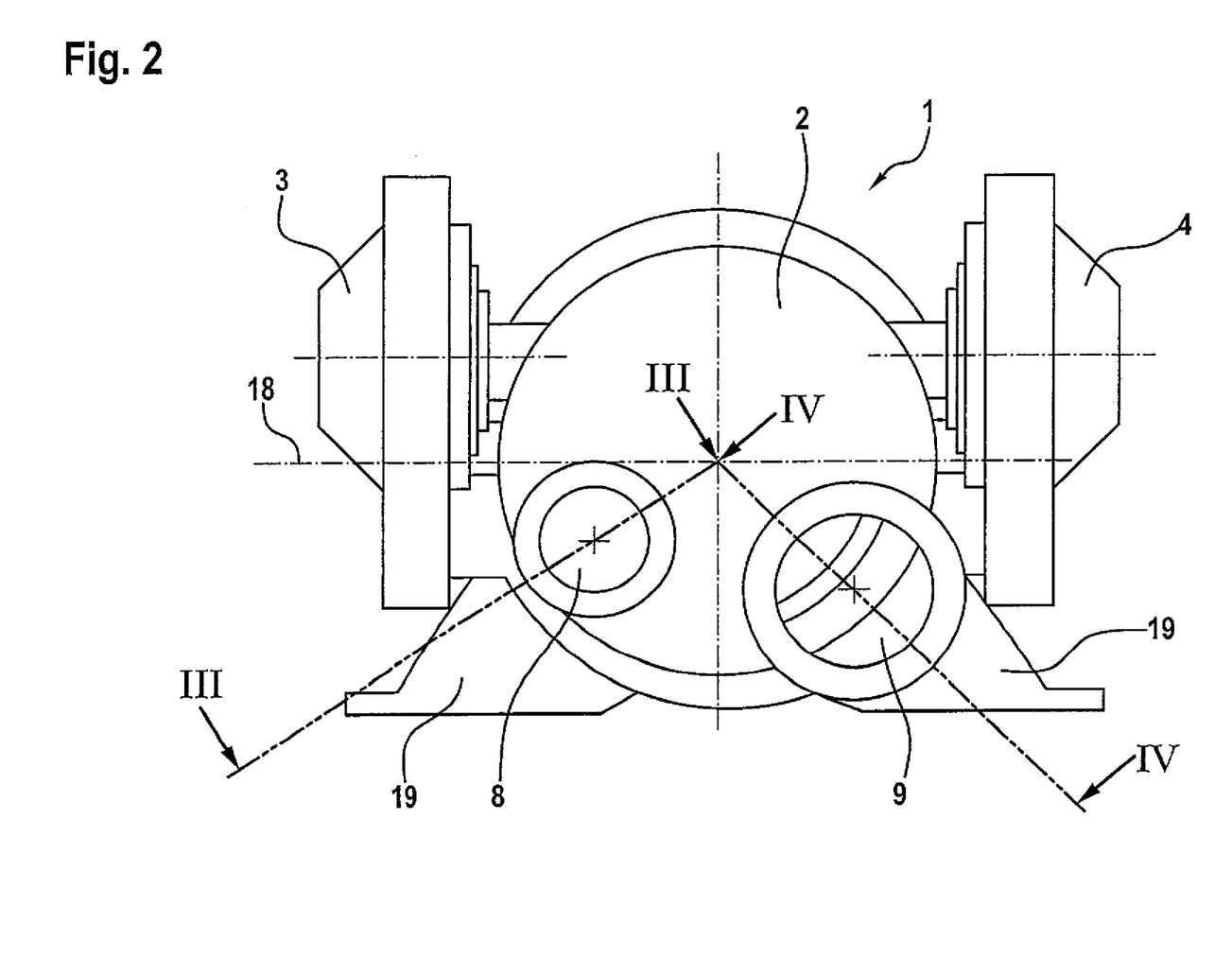
FIG. 2 a bottom side view of the valve unit of FIG. 1.

The value unit 1 is made essentially if a tank shut-off valve 2 and two tank pressure control valves 3,4, which are separate from each other and are arranged at opposite sides of the tanks shut-off valve 2. As shown in FIG. 1, the tank shut-off valve 2 an be arranged outside the fuel tank 42 and the tank pressure control valve 3, 4 inside the fuel tank 42.

The tank shut-off valve 2 is an electromagnetic valve, which is made of two rotatably interconnected parts, namely a valve part 5 with a valve seat 6, a valve member 7 which is rotatable relative to the valve seat 6 and two connections 8, 9, i.e. a tank connection 8 which is connectable to the fuel tank and a filter connection 9 which is connectable to the activated carbon filter, as well as a valve actuating part 10 with an electromagnetic coil 11 and an anchor 12 which acts on the valve member 7. When the electromagnetic coil 11 is excited, the anchor 12 lifts the valve member 7 from the valve seat 6, whereupon the two connections 8, 9 communicate with one another.

Figure 3:
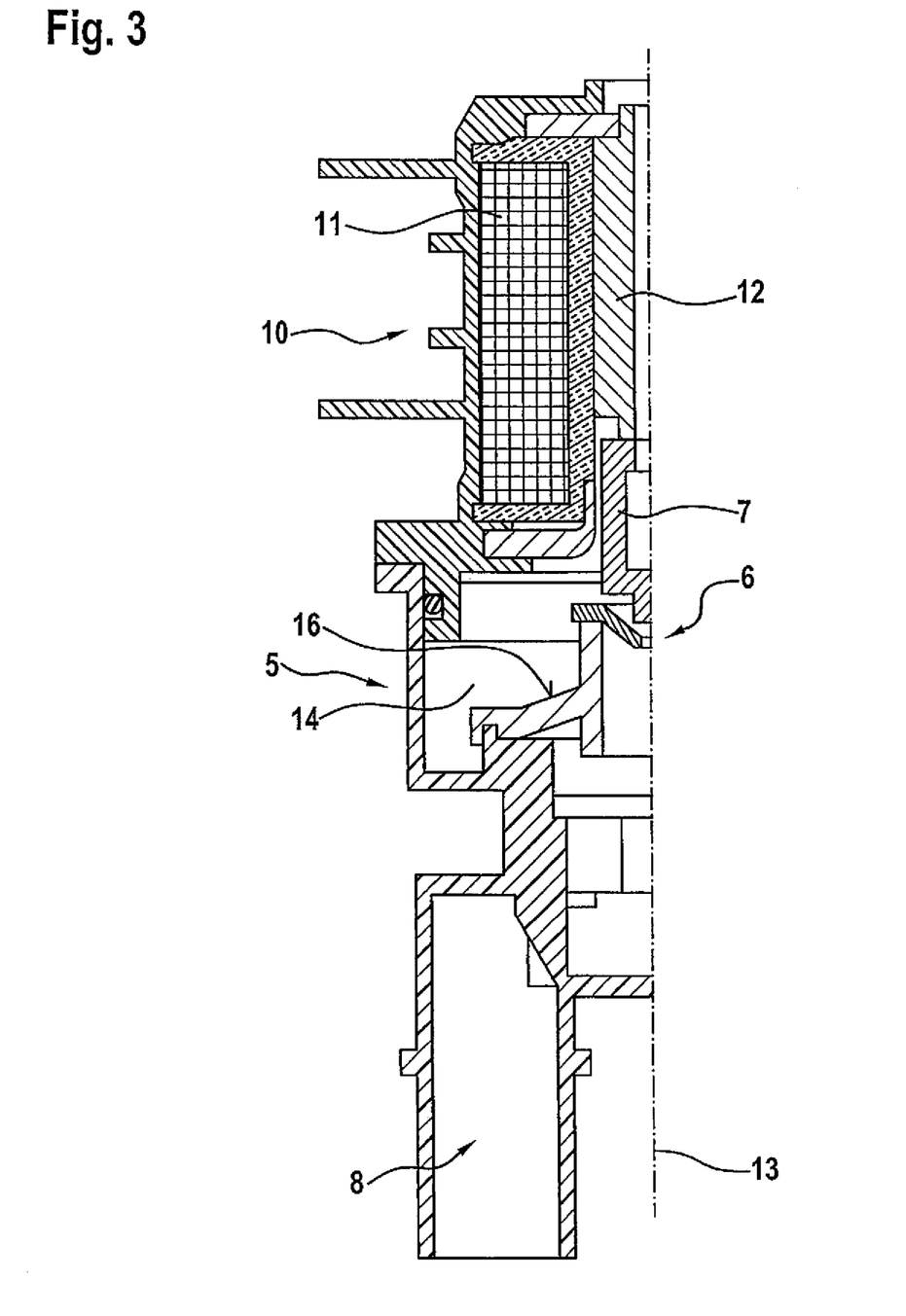
FIG. 3 a sectional view of the tank shut-off valve taken along the line III-III of FIG. 2 for explaining the condensate drainage in vertical mounting.
Figure 4:
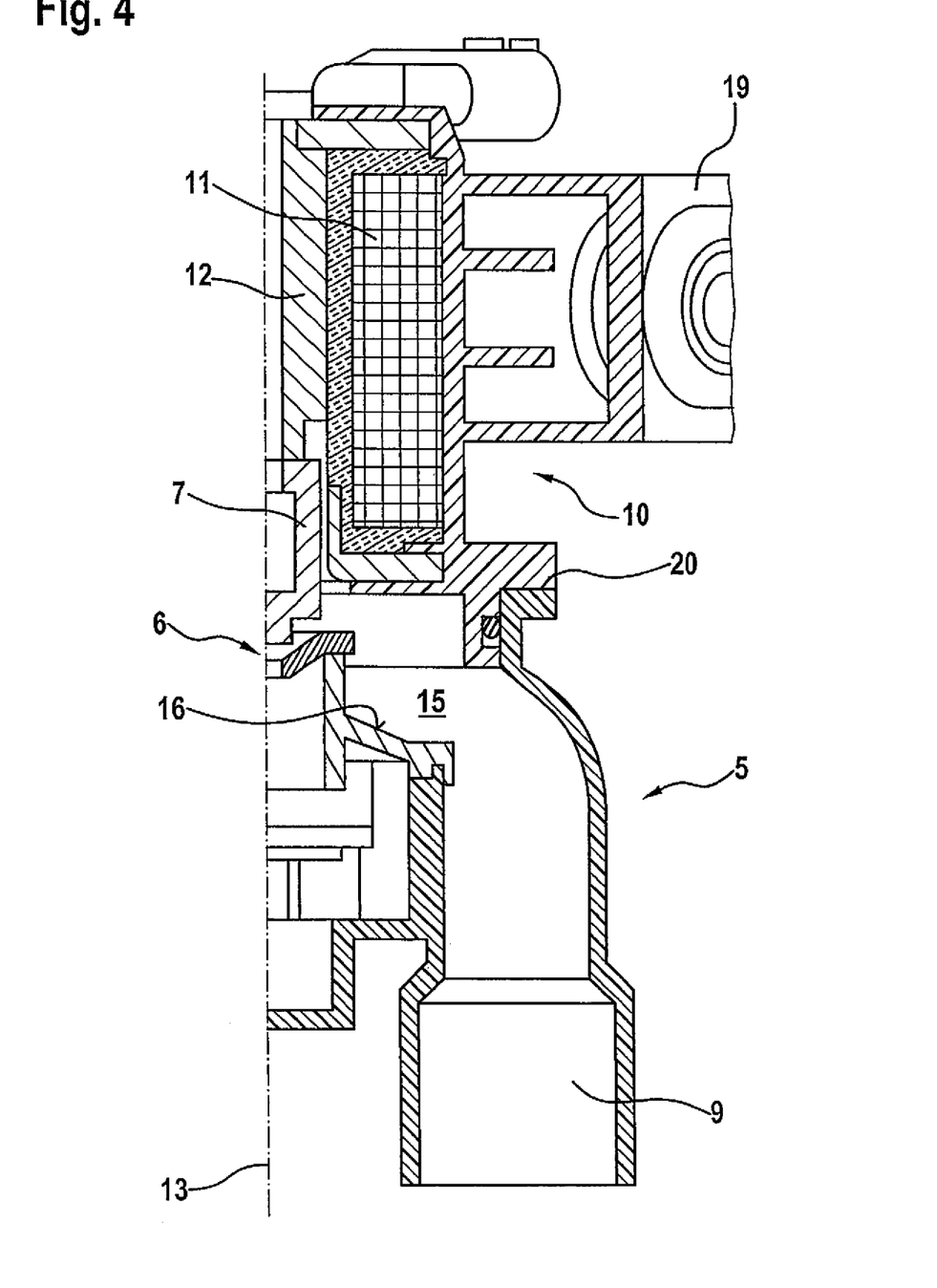
FIG. 4 a sectional view of the tank shut-off valve taken along the line IV-IV of FIG. 2 for explaining the condensate drainage in horizontal mounting.
Figure 5:
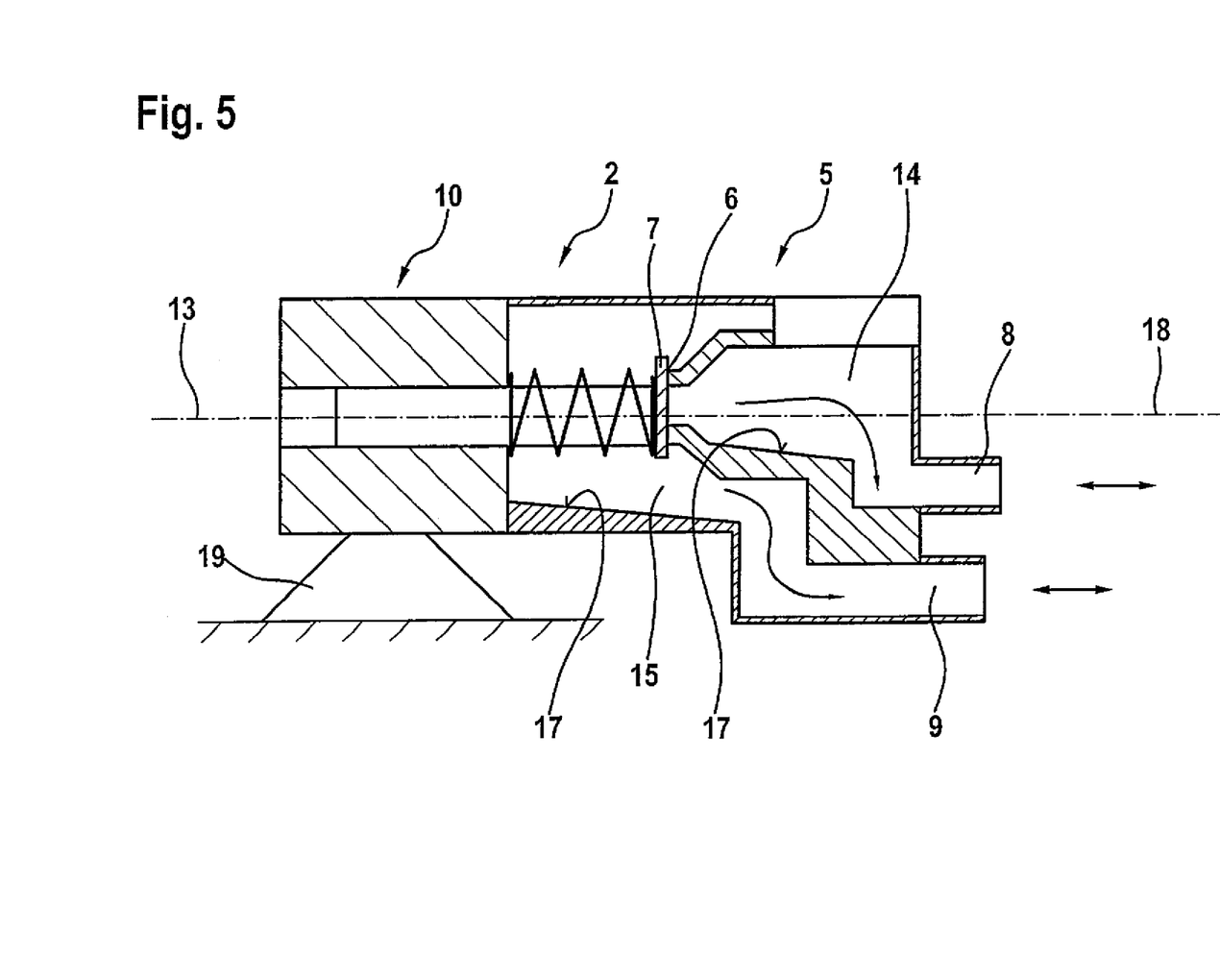
FIG. 5 a schematic sectional view of the tank shut-off valve for explaining the condensate drainage in horizontal mounting.

As best shown in FIGS. 1, 3, 4, and 5 the valve unit 1 can be mounted in different mounting positions, namely vertically, as shown in FIGS. 1, 3 and 4, i.e. with vertical longitudinal axis 13, or horizontally as schematically shown without the two tank pressure control valves 3, 4 in FIG. 5, i.e. with horizontal longitudinal axis 13. Of course, the valve unit 1 can also be mounted in any oblique mounting position between horizontally and vertically.

To prevent liquid condensate from accumulating in the interior of the tank shut-off valve 2 in one of these mounting positions, the tank shut-off valve 2 is constructed so that in a vertical mounting the tank connection 8 and the filter connection 9 are arranged on the bottom side of the valve part 5, protrude downward over the valve part 5 and both open downwards, as shown in FIGS. 1, 3 and 4. In addition, each of the two connections 8, 9 is connected to internal spaces 14 or 15, respectively of the tank shut-off valve 2 which communicate with the tank connection 8 or the filter connection 9 respectively in such a manner that condensing fuel vapor in the internal spaces 14, 15 completely flows into the connection 8, 9 which leads into the internal space 14 or 15 respectively from below as best shown in FIG. 3 or 4 respectively. To facilitate drainage of condensate out of the internal spaces 14, 15 into the connections 8 or 9 respectively, both internal spaces 14, 15 are delimited downward by slanted surfaces 16 when mounted vertically, and delimited downward by slanted surfaces 17 when mounted horizontally, which surfaces are inclined downward toward the connections 8, 9. When the valve 2 is closed, the internal spaces 14, 15 are separated from one another by the valve member 7.

Further, the tank shut-off valve 2 is constructed such that both connections 8, 9 are arranged on one side of a longitudinal middle plane 18 (FIG. 2) of the tank shut-off valve 2, which in vertical mounting is oriented vertically, and such that the valve part 5 is rotatable relative to the valve actuating part 10, which is provided with fastening means 19, about the longitudinal middle axis 13 of the tank shut-off valve 2 and is fixable in any rotational position, as best shown in FIGS. 1, 3 and 4 and by a clamping ring 20, so that the valve part 5 in a horizontal mounting is always rotatable in a position in which the two connections 8, 9 are arranged below the longitudinal middle plane 18 and open toward one side regardless of the orientation of the fastening means 19, as shown in FIG. 5. In addition, the tank connection 8 is connected to the internal space 14 and the filter connection 9 is connected to the internal space 15 such that condensing fuel vapor can completely flow into the connection 8 or 9 which leads into the internal space 14, 15 from below as shown in FIG. 5.

The two tank pressure control valves 3, 4 which are constructed as valve unit with the tank shut-off valve 2, are bypass valves one of which is a negative pressure valve 3 and the other one an overpressure valve 4. The negative pressure valve 3 also opens automatically, when a defined negative pressure forms in the fuel tank. The overpressure valve 4 opens automatically when a defined overpressure forms in the fuel tank.

Figure 6A:
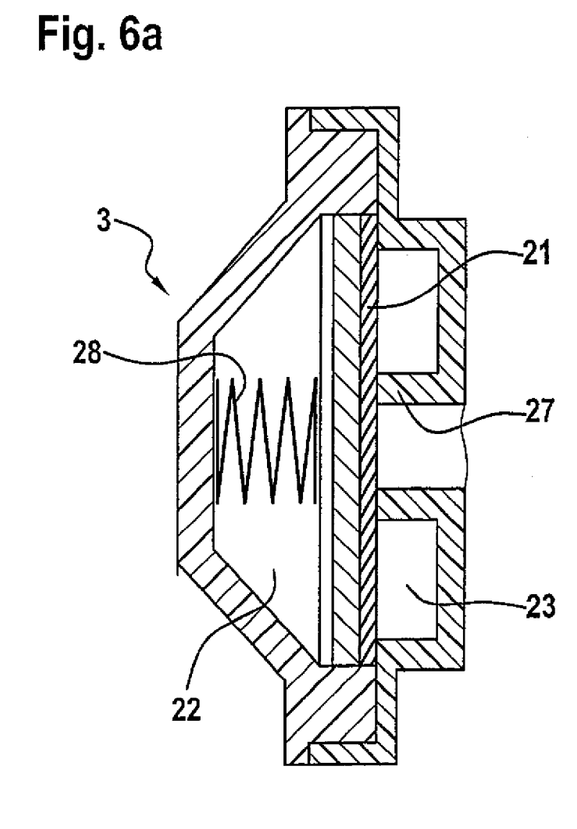
FIGS. 6a and 6b different sectional views of the two tank pressure control valves.
Figure 6B:
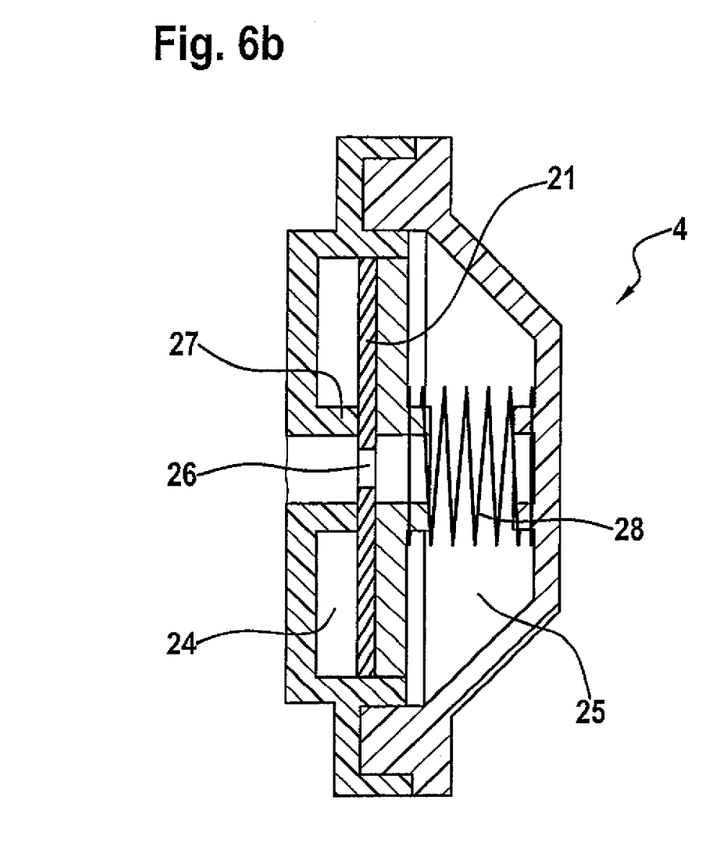

As best shown in FIGS. 6a and 6b, the two tank pressure control valves 3, 4 each have two chambers 22, 23; 24, 25, which are separated by a membrane 21, one of which chambers 22; 24 after mounting communicates with the fuel tank and one 23; 25 communicates with the activated carbon filter. In the negative pressure valve 3 in FIG. 6a the negative pressure chamber 22 faces away from the tank shut-off valve 2, while the other chamber 23 which communicates with the activated carbon filter faces toward the tank shut-off valve 2. In contrast, in the overpressure valve 4 in FIG. 6b the overpressure chamber 24 which communicates with the fuel tank faces toward the tank shut-off valve 2 while the other chamber 25 which communicates with the activated carbon filter faces away from the tank shut-off valve 2. As best shown in FIG. 6b, the membrane 21 of each valve 3, 4 is provided with an opening 26 and, when the valve is closed, rests on a cylindrical pipe socket 27 around the opening 26 through which in the overpressure valve 3 in FIG. 6a the negative pressure chamber 22 communicates with the fuel tank and in the overpressure valve 4 in FIG. 6b the other chamber 25 communicates with the activated carbon filter. The membrane 21 is pressed against the free upper end of the pipe socket 27 by the spring 28 and ensures that the two chambers 22, 23; 24, 25 do not, i.e. not normally, communicate with one another when the valve 3, 4 is closed. In the case of a stronger negative pressure in the fuel tank the membrane 21 of the negative pressure valve 3 is lifted from the pipe socket against the force of the spring 28 as a result of the negative pressure in the negative pressure chamber which communicates with the fuel tank, whereby the two chambers 22, 23 are connected to one another when the valve 3 is opened. In the case of a stronger overpressure in the fuel tank the membrane 21 is lifted from the pipe socket 27 against the force of the spring 28 as a result of the pressure in the overpressure chamber 24, whereby the two chambers 24, 25 are connected to one another also by opening of valve 4.

Because the negative pressure valve 3 and the overpressure valve 4 have separate membranes 21, the opening pressure for both valves 3, 4 can be set flexibly, i.e. independent of one another and without interfering with one another on one hand by choosing an appropriate membrane 21 and on the other hand by choosing an appropriate spring characteristic of the spring 28.

The overpressure chamber 24 of the overpressure valve 4 and the negative pressure chamber 22 of the negative pressure valve 3 communicate with the tank connection 8 through the internal space 14 of the tank shut-off valve 2, while the other chamber 25 of the overpressure valve 4 and the other chamber 23 of the negative pressure valve 3 communicate with the filter connection 9 through the internal space 15 of the tank shut-off valve 2.

Figure 7:
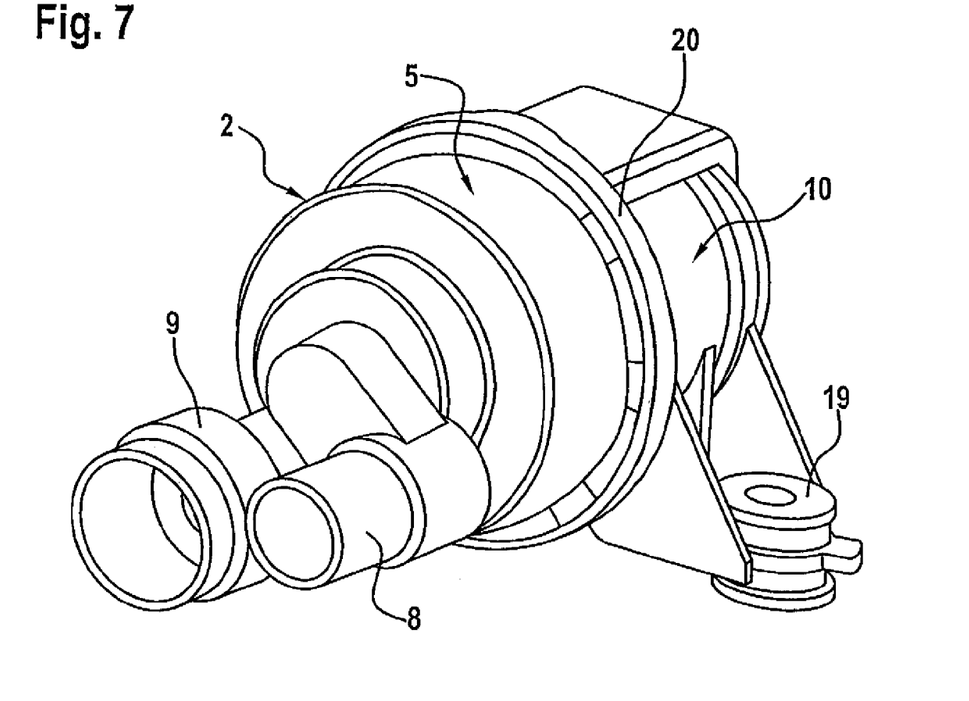
FIG. 7 a perspective view of another tank shut-off valve.

The tank shut-off valve 2 shown in FIG. 7 is constructed in the same way as the tank shut-off valve 2 in the FIGS. 1, 2, 3 and 5 except that the two tank pressure control valves 3, 4 i.e. the negative pressure valve 3 and the overpressure valve 4 are not combined with the tank shut-off valve 2 into a valve unit 1. Instead, the two tank pressure control valves 3, 4 form valve units 29, 30 which are separate from the tank shut-off valve 2, as shown in FIGS. 8 to 13, so that it is possible for example to mount the two tank pressure control valves 3, 4 inside the fuel tank and the tank shut-off valve 2 outside the fuel tank.

Figure 8:
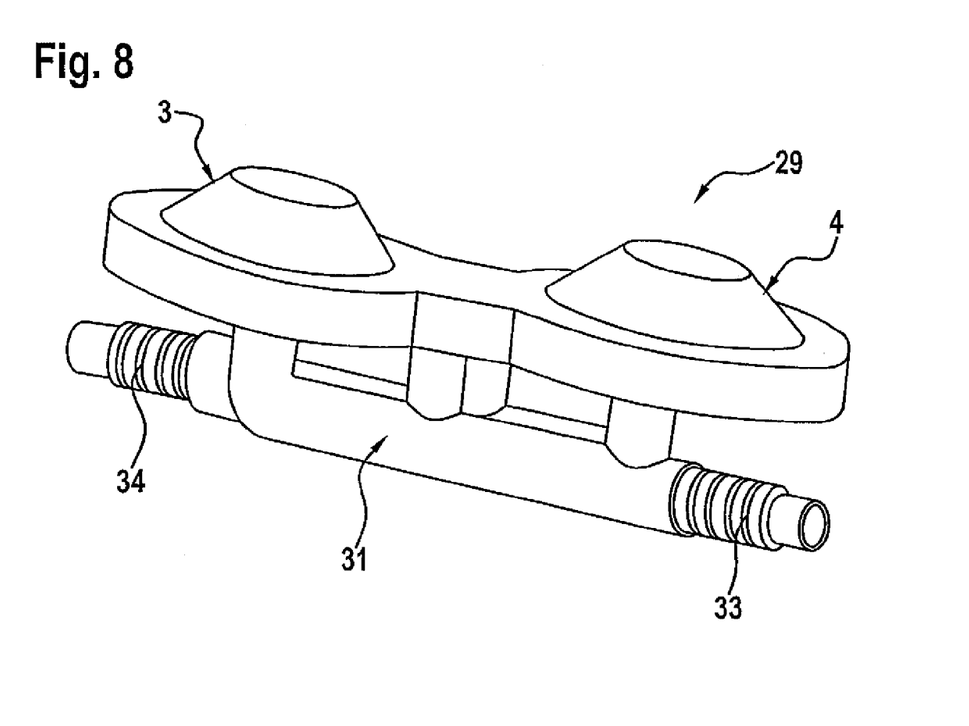
FIG. 8 a perspective view of a valve unit made of two tank pressure control valves.
Figure 9:
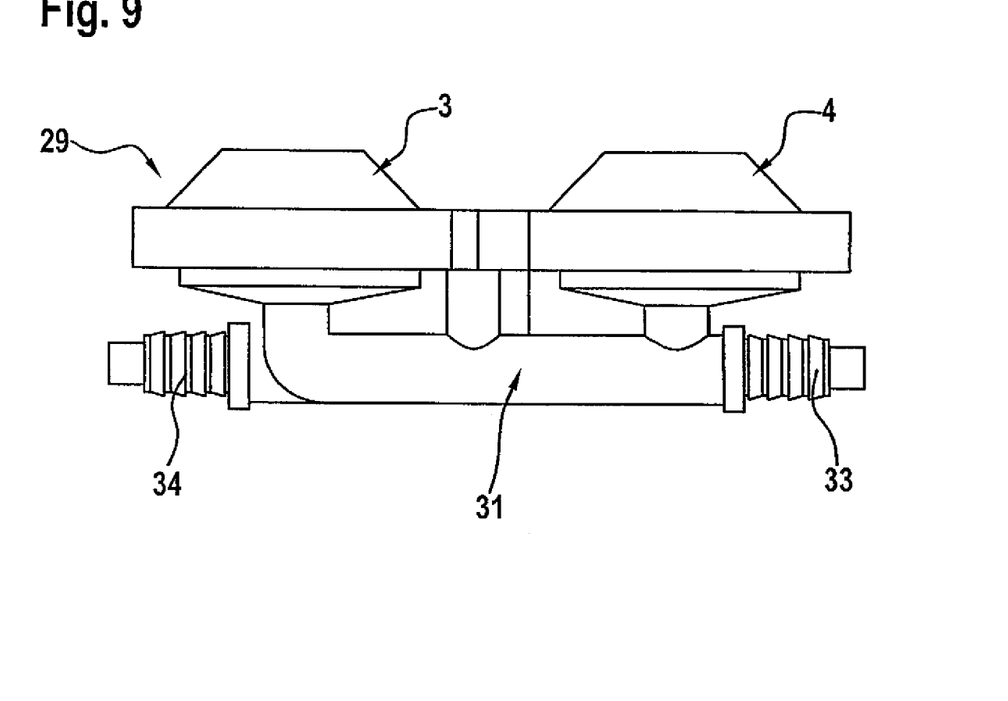
FIG. 9 a side view of the valve unit of FIGS. 8 and 9.
Figure 10:
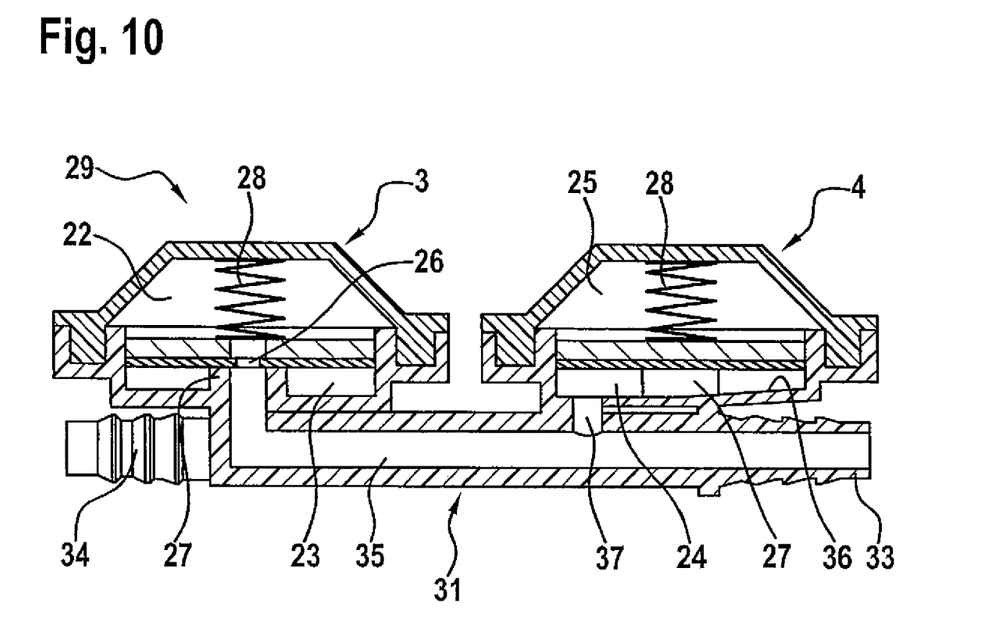
FIG. 10 a longitudinal side view of the valve unit of FIGS. 8 and 9.
Figure 11:
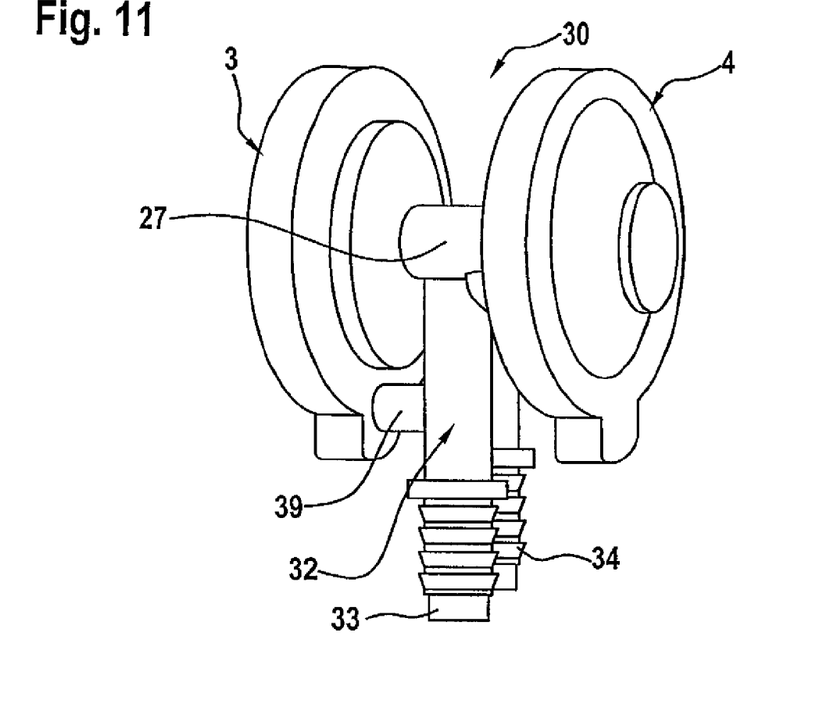
FIG. 11 a perspective view of another valve unit made of two tank pressure control valves.
Figure 12:
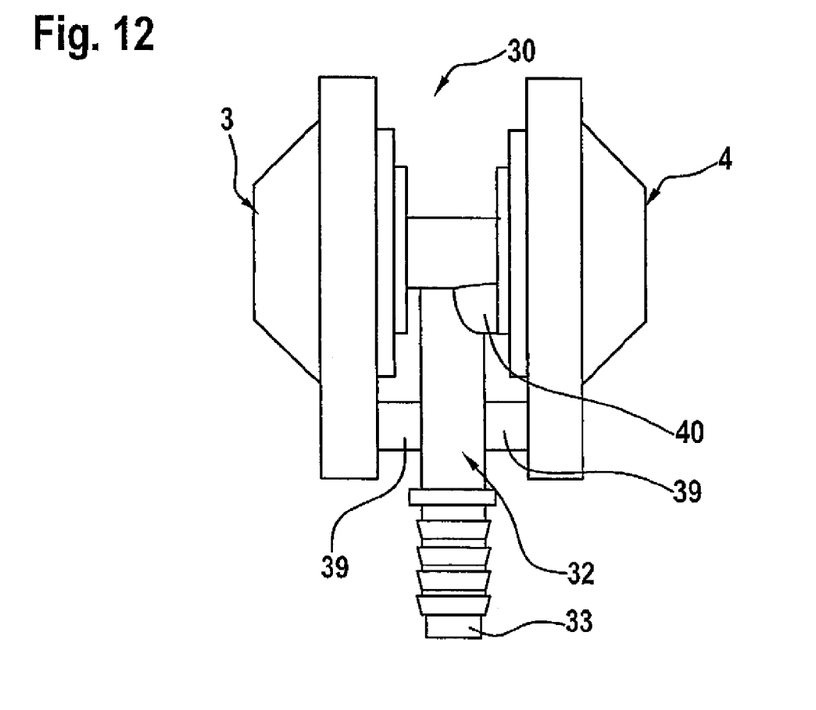
FIG. 12 a side view of the valve unit of FIG. 11.
Figure 13:
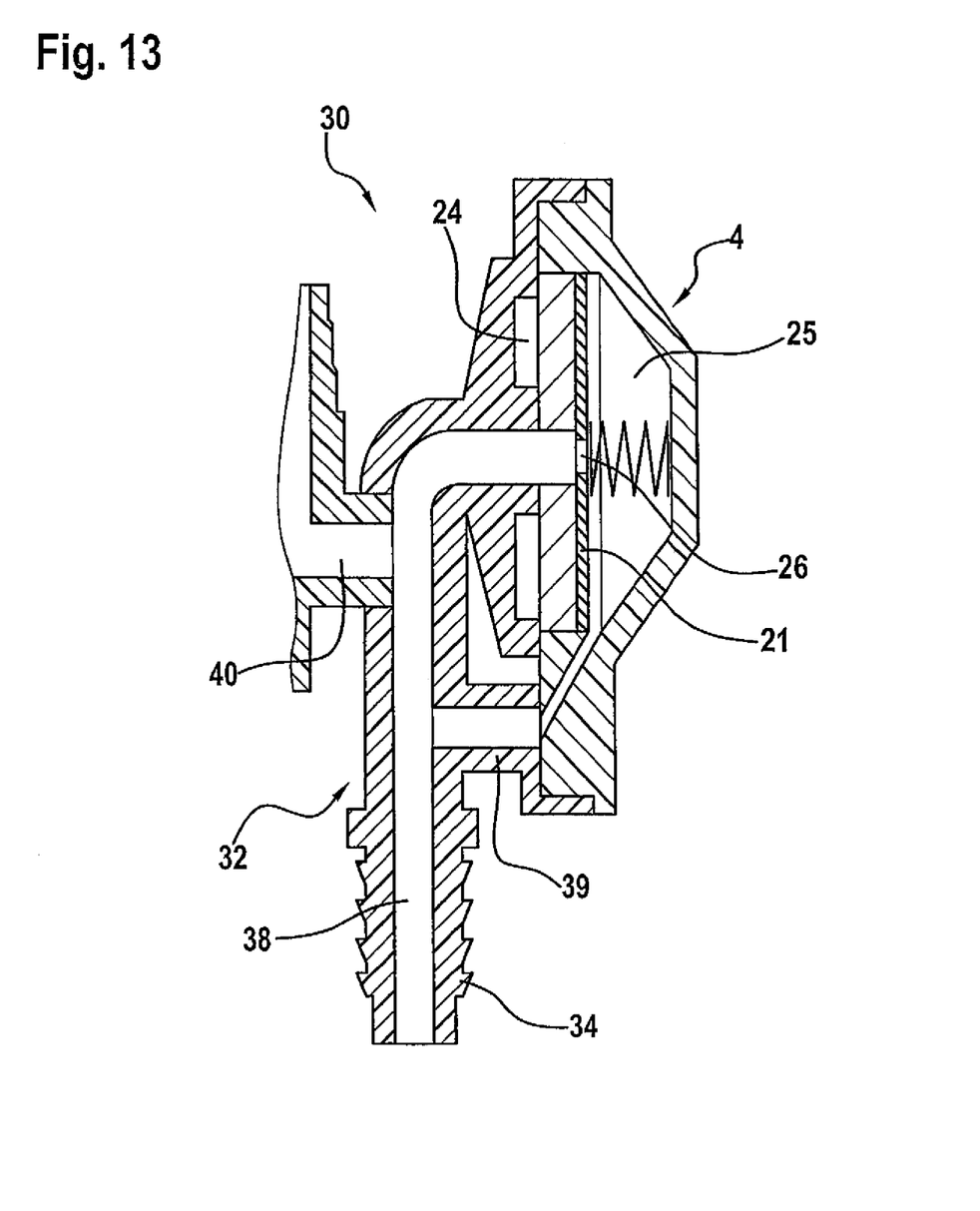
FIG. 13 a cross sectional view of the valve unit of FIGS. 11 and 12.

In the valve unit shown in FIGS. 8 to 10, the two tank pressure control valves, i.e. the negative pressure valve 3 and the overpressure valve 4, have the same orientation and are arranged adjacent to one another along a connection part 31, while in the valve unit 30 in the FIGS. 11 to 13 the two tank pressure control valves 3, 4 have opposite orientations and are arranged on an end of a connection part 32.

In both valve units 29, 30 the negative pressure chamber 22 of the negative pressure valve 3 which chamber 22 communicates with the fuel tank and the overpressure chamber 24 of the overpressure valve 4 which chamber 24 also communicates with the fuel tank, are connected to a common tank connection 33 of the valve unit 29, 30, while the other chamber 23 of the negative pressure valve 3 which chamber 23 communicates with the activated carbon filter and the other chamber 25 of the overpressure valve 4 which chamber 25 also communicates with the activated carbon filter are connected to a common filter connection 34 of the valve unit 29, 30.

As best shown in FIG. 10 in the valve unit 29 in FIGS. 8 to 10 the pipe socket 27 of the negative pressure valve 3 leads into the negative pressure chamber 22 from below, while its lower end communicates with the connection part 31 through a tube 35 in the connection part which tube 35 is oriented horizontally after mounting of the valve unit 29, so that condensing fuel can drain out of the negative pressure chamber 22 through the pipe socket 21 to the tank connection 33. The overpressure chamber 24 of the overpressure valve 4 is delimited at its bottom side by a slanted bottom 36 and communicates at its lowest point with the tube 35 which leads to the tank connection 33, through a passage 37, so that condensate from the overpressure chamber 24 can also completely drain to the tank connection 33.

Conversely, in the valve unit 29 the pipe socket 27 of the overpressure valve 4 leads into the other chamber 25 from below, while its lower end communicates with a filter connection 34 through a tube (not shown) in the connection part 31, which tube after mounting of the valve unit 29 is oriented parallel to the tube 35, so that condensing fuel can drain out of the chamber 25 through the pipe socket 21 to the filter connection 34. The other chamber 23 of the negative pressure valve 3 is also delimited at its bottom side by a slanted bottom (not visible) and communicates at its lowest point through a passage (not visible) with the tube which leads to the filter connection 34, so that condensate can also drain completely out of the chamber 23 to the filter connection 34.

As best shown in FIG. 13, in the valve unit 30 in FIGS. 11 to 13, the chamber 25 of the overpressure valve 4 communicates at the lowest point of the chamber 25 with a vertical tube 38 in the connection part 32 which tube leads to the filter connection 34, not only through the pipe socket 27 but also through a further passage 39, so that condensate can drain from the chamber 25 through the passage 39 and the tube 38 to the filter connection 34. Similar to the overpressure chamber 24 in the overpressure valve 4 of the valve unit 29, the overpressure chamber 24 of the overpressure valve 4 is connected to the vertical tube 38 in the connection part 32, through a single passage 40 which is arranged at the lowest point of the chamber 24, as shown in FIG. 12.

The negative pressure valve 3 (only partially shown in FIG. 13) has a corresponding construction, wherein however, the other chamber 23 at its lowest point communicates through a passage 40 with the vertical tube 38 which leads to the filter connection 34, while the negative pressure chamber (not visible) communicates through the pipe socket 27 and a further passage 39 at the lowest point of the negative pressure chamber with a tube in the connection part 32 which tube leads to the tank connection 33 and is parallel to the tube 38, as best shown in FIGS. 11 and 12.

What is claimed is:

1. A device for ventilating and aerating a fuel tank, comprising:
   a tank shut-off valve; and
   two tank pressure control valves operating independently from one another, one of the two tank pressure control valves configured to open in response to a negative pressure in the fuel tank and another one of the two tank pressure control valves configured to open in response to an overpressure in the fuel tank,
   wherein the two tank pressure control valves are mounted on opposite sides of the tank shut-off valve.

2. The device of claim 1, wherein the two tank pressure control valves and the tank shut-off valve are combined to form a valve unit.

3. The device of claim 2, wherein each of the two tank pressure control valves has two chambers separated from one another by a membrane, wherein two chambers of the two tank pressure control valves communicate through an internal space of the tank shut-off valve with a tank connection which leads to the fuel tank, and two chambers of the two tank pressure control valves communicate through an internal space of the tank shut-off valve with a filter connection which leads to an activated carbon filter.

4. The device of claim 1, wherein the two tank pressure control valves are mounted separated from one another on the tank shut-off valve.

5. The device of claim 1, wherein the two tank pressure control valves are assembled to form a valve unit.

6. The device of claim 5, wherein the valve unit has a single tank connection and a single filter connection, said single tank connection communicating with the fuel tank and said single filter connection communicating with an activated carbon filter.

7. The device of claim 6, wherein each of the two tank pressure control valves has two chambers separated from one another by a membrane, one of the two chambers communicating with the tank connection and the other one of the two chambers communicating with the filter connection.

8. The device of claim 6, wherein the two tank pressure control valves have a same orientation and are arranged adjacent to one another along a common connection part, said connection part having opposite ends, one of the ends provided with the tank connection, and another one of the ends provided with the filter connection.

9. The device of claim 6, wherein the two tank pressure control valves have opposite orientations and are arranged at a same end of a common connection part, said common connection part having another end provided with the tank and filter connections.

10. A device, comprising:
    a tank shut-off valve; and
    two tank pressure control valves operating independently from one another, one of the two tank pressure control valves configured to open in response to a negative pressure in the fuel tank and another one of the two tank pressure control valves configured to open in response to an overpressure in the fuel tank, wherein the two tank pressure control valves are arranged inside the fuel tank, and the tank shut-off valve is arranged outside the fuel tank.

11. The device of claim 10, wherein the two tank pressure control valves and the tank shut-off valve are combined to form a valve unit.

12. The device of claim 11, wherein each of the two tank pressure control valves has two chambers separated from one another by a membrane, wherein two chambers of the two tank pressure control valves communicate through an internal space of the tank shut-off valve with a tank connection which leads to the fuel tank, and two chambers of the two tank pressure control valves communicate through an internal space of the tank shut-off valve with a filter connection which leads to an activated carbon filter.

13. The device of claim 10, wherein the two tank pressure control valves are mounted separated from one another on the tank shut-off valve.

14. The device of claim 10, wherein the two tank pressure control valves are assembled to form a valve unit.

15. The device of claim 14, wherein the valve unit has a single tank connection and a single filter connection, said single tank connection communicating with the fuel tank and said single filter connection communicating with an activated carbon filter.

16. The device of claim 15, wherein each of the two tank pressure control valves has two chambers separated from one another by a membrane, one of the two chambers communicating with the tank connection and the other one of the two chambers communicating with the filter connection.

17. The device of claim 15, wherein the two tank pressure control valves have a same orientation and are arranged adjacent to one another along a common connection part, said connection part having opposite ends, one of the ends provided with the tank connection, and another one of the ends provided with the filter connection.

18. The device of claim 15, wherein the two tank pressure control valves have opposite orientations and are arranged at a same end of a common connection part, said common connection part having another end provided with the tank and filter connections.

* * * * *